United States Patent [19]

Takada

[11] 4,365,827
[45] Dec. 28, 1982

[54] DRIVE WIRE FOR PASSIVE RESTRAINT SYSTEMS

[76] Inventor: Juichiro Takada, 3-12-1, Shinmachi, Setagayaku, Tokyo, Japan

[21] Appl. No.: 243,476

[22] Filed: Mar. 13, 1981

[30] Foreign Application Priority Data

Mar. 24, 1980 [JP] Japan .......................... 55-037318[U]

[51] Int. Cl.$^3$ ............................................ B60R 21/10
[52] U.S. Cl. ....................................... 280/804; 29/517; 403/284
[58] Field of Search ..................... 280/804; 29/517; 403/274, 275, 284

[56] References Cited

U.S. PATENT DOCUMENTS

| | | | |
|---|---|---|---|
| 4,262,934 | 4/1981 | Takada | 280/804 |
| 4,274,658 | 6/1981 | Takada | 280/804 |
| 4,296,943 | 10/1981 | Takada | 280/804 |

Primary Examiner—Robert R. Song
Attorney, Agent, or Firm—Brumbaugh, Graves, Donohue & Raymond

[57] ABSTRACT

An improved drive wire for a passive vehicle occupant restraint belt system comprises a length of racked wire composed of a stranded wire core and a helically wound tooth wire, and a length of transfer wire composed of a stranded wire core and a covering of durable polymeric material joined to each other at a butt splice connection that includes a pressed-on metal collar adjacent to the end of each stranded wire core, a band of polymeric material on each core adjacent the collar and a pressed-on coupling sleeve surrounding and joining the collars and embracing the polymeric bands for relief of concentrated stresses adjacent the collars.

4 Claims, 4 Drawing Figures

DRIVE WIRE FOR PASSIVE RESTRAINT SYSTEMS

FIELD OF THE INVENTION

The present invention relates to passive type vehicle occupant restraint belt systems and, in particular, to an improved drive wire for use in such systems.

BACKGROUND OF THE INVENTION

In the past few years considerable effort has gone into the design and development of so-called passive vehicle occupant restraint belt systems, i.e., restraint belt systems that automatically move to an occupant-restraining configuration when an occupant is seated in the vehicle and the vehicle door is closed and automatically transfer to an occupant-releasing configuration when the vehicle door is opened. Many such passive systems, and components therefor, have been proposed in anticipation that the Government will require that they be incorporated in new vehicles and that purchasers of new vehicles will want them in any event. Many of the systems that have been advanced thus far and, no doubt, many that will be proposed in the future have a belt transfer member that engages a portion of the restraint belt or in some cases a control belt and is driven along a guide rail by a drive system between a release position and a restraint position. The drive wire that transmits the output of an electric motor or a mechanical motion amplifier to the movable belt transfer member is a very important component of many passive restraint systems, inasmuch as it is called upon to position the belt transfer member at the release and restraint positions with a relatively high degree of precision over many thousands of cycles of operation. Accordingly, it must be constructed to fairly close tolerances out of durable materials and must be capable of moving along curved paths, which means that it must be somewhat flexible. At the same time it must have sufficient stiffness to transmit motion by pushing the belt transfer member along the guide rail.

A very adequate form of transfer wire for passive belt systems is the so-called racked wire. Racked wires consist of a continuous core wire element and a continuous tooth wire element wrapped helically around the core wire element and securely fixed thereto. A disadvantage of a racked wire for driving the movable belt transfer member is the fact that the portion which moves in and out of the guide rail is subject to abrasion and also subjects the guide rail to abrasion. Moreover, the rubbing between the wire and rail makes a fair amount of noise, which can be bothersome to the occupant. Possible solutions to the noise and abrasion problems are to encase the part of the drive wire that moves in and out of the guide rail in a plastic cover or sheet or to apply a plastic coating over it. Those solutions are not altogether satisfactory, however, because they increase the cross-sectional size of the drive wire and conflict with the objective of minimizing the size and weight of the rail.

FIG. 2 of the accompanying drawings shows another possible solution to the abrasion and noise problem that has been tried. The drive wire 30 comprises a wire core 12 which is fastened at one end to a slider 14 that moves along the guide rail and carries an emergency release buckle 16 to which the belt B is connected by a buckle tongue 18. The other end of the core wire 12 receives a cap 20. The portion 12a of the core wire 12 that moves in and out of the guide rail as the belt transfer member 14 moves between the restraint and release positions along the guide rail has a plastic covering 22. The remainder of the core wire 12 has the tooth wire 24. In order to minimize the diameter of the portion 12a of the drive wire the tooth wire has been removed. The prior solution illustrated in FIG. 2 has the disadvantage of being quite difficult and expensive to make. It is also difficult and expensive to manufacture special racked wires having tooth wire wound only over part of the length and to apply a cover or coating to only part of the total length of the drive wire.

SUMMARY OF THE INVENTION

There is provided, in accordance with the present invention, a comparatively simple and highly effective solution to the problem of providing a drive wire that can be produced economically on a mass production basis and that meets the requirements of running noiselessly and without abrasion through a guide rail that is of comparatively small cross section. In particular, the improvement in the drive wire comprises a length of racked wire that is adapted to be driven by a drive device, such as a gear-reduced electric motor or the output gear of a mechanical motion amplifier, and a length of transfer wire joined to each other at a butt splice connection. Both the racked wire and the transfer wire have a stranded wire core. The racked wire receives a helically wound tooth wire, and the transfer wire core is covered with a durable polymeric material, preferably a polyamide such as polyethylene. As a further aspect of the invention, smooth running of the transfer wire portion of the drive wire along the guide rail is facilitated by incorporating a lubricant into the covering, for example, silicon or graphite. The relative lengths of the racked wire and transfer wire will depend generally on the comparative costs of the plastic coated wire and the racked wire, subject, however, to the requirement that both the transfer wire and the racked wire be no shorter than the distance along the guide rail between the release and the restraint positions. The transfer wire should be of such a minimum length so that no part of the racked wire enters the guide rail. Similarly, the racked wire must be of sufficient length to provide for movement of the belt transfer member between the release and restraint positions.

In accordance with the present invention, the butt splice connection between the racked wire and the transfer wire includes a pressed-on metal collar adjacent the end of each stranded wire core, i.e. the core of the racked wire and the core of the transfer wire. A band of polymeric material surrounds each core adjacent the collar, and a pressed-on coupling sleeve surrounds and joins the collars and also embraces the polymeric material bands. The foregoing construction of the splice minimizes concentrated stresses adjacent the collars. In particular, if the core wires were to be directly connected by a single pressed-on sleeve, the regions of the core wire immediately adjacent the sleeve would be subjected to highly concentrated stresses whenever the portion of the composite drive wire adjacent the splice is subjected to even fairly moderate bending.

The bands of polymeric material embraced by the coupling sleeve adjacent the collars reduce stress concentrations by providing a zone of transition between the comparatively stiff region immediately within the coupling sleeve and the collars and the adjacent portions of the racked wire and the transfer wire, respectively. The polymeric bands adjacent the collars are inherently somewhat flexible and compressible and spread the loads due to bending along the portions of the wire which they embrace.

For better understanding of the invention, reference may be made to the following description of exemplary embodiments, taken in conjunction with the figures of the accompanying drawings.

DESCRIPTION OF EXEMPLARY EMBODIMENTS

Figure 1:
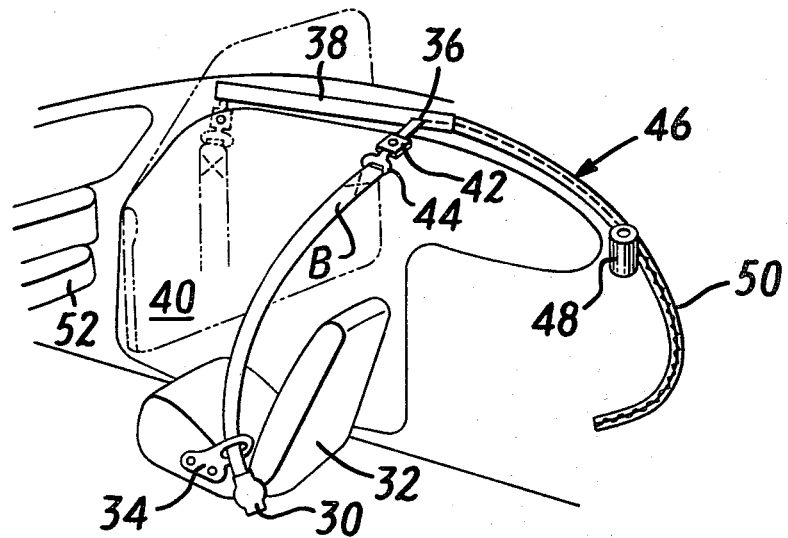
FIG. 1 is a pictorial view in schematic form of a passive belt system that is exemplary of systems in which the improved drive wire may be used.
Figure 2:
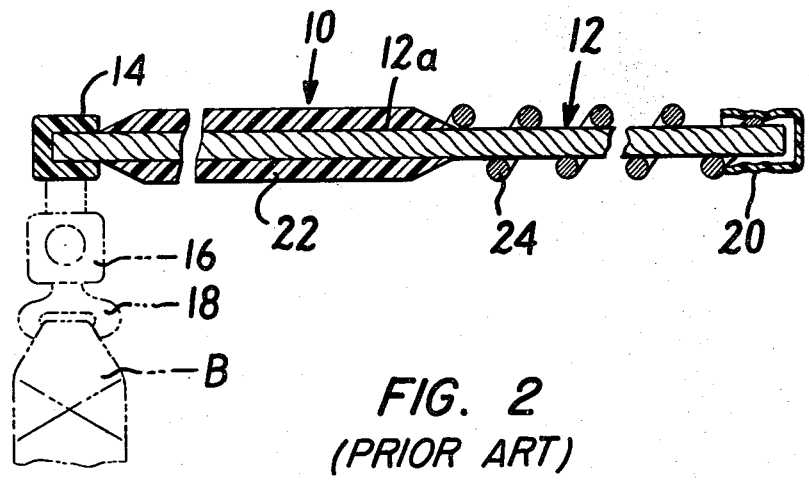
FIG. 2 is a cross-sectional view of a drive wire that has been tried heretofore.

The passive restraint system shown in FIG. 1 comprises a shoulder belt B that leads from an emergency locking retractor 30 affixed to the vehicle body adjacent the lower rear inboard portion of the seat 32 through a belt guide 34 outwardly and upwardly across the seat to a moving anchor 36 that is movable forward and backward along a guide rail 38 affixed at the edge of the vehicle roof generally above the door 40. The outboard end of the belt B is connected to the moving anchor 36 by an emergency release buckle 42 and buckle tongue 44. The moving anchor 36 is driven back and forth along the guide rail 38 between a restraint position adjacent the rear of the rail and a release position (phantom lines in FIG. 1) adjacent the front of the rail by a drive wire 46, which will be described in more detail below. The drive wire is driven forward and backward by a gear-reduced electric motor drive unit 48 and is guided along an established path in the vehicle body by a guide tube 50. The drive unit 48 is controlled by door switches and limit switches in a well-known manner, such that when the door is opened, the movable anchor 36 is driven forward to the release position (phantom lines) and when the door is closed, is moved back to the restraint position above and behind the occupant. The retractor 30 holds the belt firmly but comfortably across the occupant's torso and restrains him in the event of collision or an abrupt stop. The lower part of the occupant's body is protected by an energy-absorbing knee bolster 52 installed under the dashboard.

The restraint system shown in FIG. 1 is merely exemplary of a variety of passive belt systems with which the improved drive wire of the present invention can be used. Other systems in which the drive wire is useful include three-point belt systems having a guide rail along the roof or on the vehicle door or both and two and three-point systems in which a belt transfer member moves forward and backward adjacent the inboard part of the vehicle. Such systems may employ any of a variety of types of moving anchors or belt guide rings. The drive wire may be driven by a mechanical motion amplifier rather than an electric motor.

Figure 3:
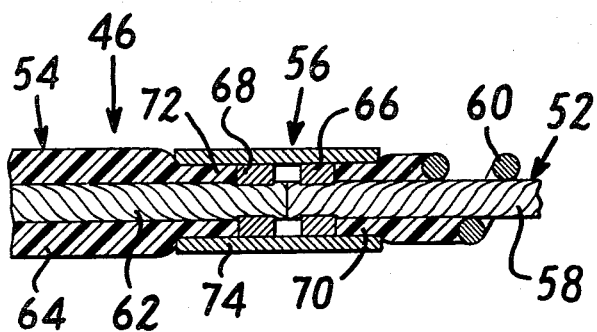
FIG. 3 is a longitudinal cross-sectional view of a portion of one embodiment of a drive wire in accordance with the present invention.

The embodiment of improved drive wire 46 shown in FIG. 3 comprises a length of conventional racked wire 52 and a length of transfer wire 54 joined to each other by a butt joint splice assembly 56. The racked wire length 52 is a stranded wire core 58 wrapped with a helical tooth wire 60. The transfer wire length 54 is composed of a stranded wire core 62, which may be the same as or similar to the core 58 of the racked wire length 52, and a cover of a suitable durable polymeric material 64. A preferred cover material 64 is a polyamide, such as polyethylene. Advantageously, the coating material incorporates a lubricant, such as silicon or graphite, thereby insuring smooth running along the guide rail.

The racked wire length 52 and the transfer wire length 46 are each of a length not less than the distance measured along the guide rail between the restraint position and the release position of the belt transfer member. In the case of the racked wire, such a length is, of course, necessary so that the drive wire is moved by the drive device the required distance. In the case of the transfer wire 46 such a length is advantageous to insure that no part of the racked wire enters the guide rail. Apart from these limitations, the relative proportions of the total length of the complete drive wire 46 accounted for by the racked wire 52 and the transfer wire 54 can be chosen on the basis of which is the least expensive of the two, or perhaps by other requirements of the particular system.

The splice 56 comprises a pressed-on metal sleeve 66 secured adjacent the end of the core 58, a similar or identical pressed-on sleeve 68 secured adjacent the end of the core wire 62 of the transfer wire 54, a band 70 of polymeric material on the core wire 58 immediately adjacent the collar 66 and a band of polymeric material 72 on the core wire 62 immediately adjacent to the collar 68. The band 70 on the racked wire 52 may be of the same polymeric material as the cover 64 or may be any other suitable polymeric material exhibiting moderate flexibility and compressibility for purposes of load distribution. The band 70 can be molded in place on the end of the drive wire or can be in a form of tape wrapped around the end of the drive wire in a region from which a small amount of the tooth wire 60 has been removed. The band 72 on the transfer wire 54 is, most conveniently, the end portion of the covering 64. A small length of covering is removed from the transfer wire 54 to make room for the pressed-on sleeve 68.

A metal coupling sleeve 74 is pressed on over the abutting ends of the racked wire 52 and the transfer wire 54. The coupling sleeve 74 provides a strong pressed-on compression fit to both of the collars 66 and 68 and is of such an overall length as to embrace the polymeric bands 70 and 72 adjacent the collars. The bands 70 and 72 of polymeric material encased within the coupling sleeve 74 provide zones of transition between the comparatively rigid section of the splice where the collars are joined by the coupling sleeve and the otherwise unsupported segments of the wires adjacent the splice. Those regions of transition constituted by the bands 70 and 72 distribute bending loads along the core wires 58 and 62 and prevent stress concentrations that would otherwise exist where the core wires 58, which are relatively flexible, join the much stiffer splice. The considerable reduction in stress concentration enables the splice to be bent relatively sharply and greatly increases the useful life of the drive wire.

Figure 4:
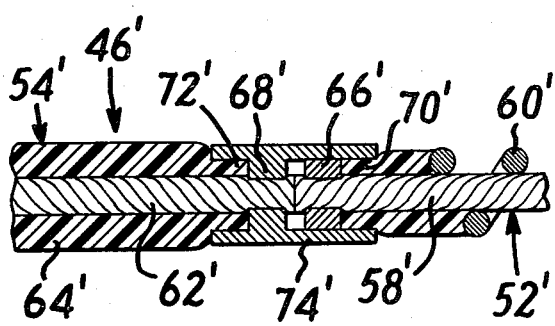
FIG. 4 is a longitudinal cross-sectional view of a portion of another embodiment of the present invention.

The embodiment shown in FIG. 4 of the drawings is almost identical to the embodiment shown in FIG. 3. Accordingly, the same reference numerals, but with prime suffixes, are applied to FIG. 4. The only difference between those two embodiments is the fact that the collar 68' on the end of the wire 62' is an integral part of the coupling sleeve 74'. The collar 68' is pressed onto the core wire 62', and the racked wire, with the collar 66' and the plastic band 70' already installed, is inserted endwise into the open end of the coupling sleeve 74. The coupling sleeve is then pressed onto the collar 66' to complete the assembly of the drive wire.

Thus, the present invention provides, in a simple and inexpensive way, a drive wire that runs easily and quietly along a transfer rail by virtue of a polymeric cover on the transfer wire segment that moves along the guide rail and is driven precisely between the restraint and the release configurations by a racked wire segment. Stress concentrations are reduced due to load-spreading of polymeric bands within the coupling sleeve so that the part of the drive wire where the transfer wire segment and racked wire segment are joined can be bent with considerably reduced potential for failure due to stress concentration and with the expectation of long-time service.

The above-described embodiments of the invention are merely exemplary, and numerous variations and modifications will be readily apparent to those skilled in the art without departing from the spirit or scope of the invention. All such variations and modifications are intended to be included within the scope of the invention, as defined in the appended claims.

I claim:

1. In a passive vehicle occupant restraint belt system having a belt transfer member engaging a portion of a belt and driven by a drive wire along a guide rail between release and restraint locations, the improvement in the drive wire comprising (a) a length of racked wire adapted to be driven by a drive device and including a stranded wire core and a helically wound tooth wire; (b) a length of transfer wire having a stranded wire core and a covering of a durable polymeric material, the transfer wire being coupled to the belt transfer member and being no shorter than the distance along the guide rail between the release and restraint positions, and (c) a butt splice connection between the racked wire and the transfer wire that includes a pressed-on metal collar adjacent the end of each stranded wire core, a band of polymeric material on each core adjacent the collar and a pressed-on coupling sleeve surrounding and joining the collars and also embracing the polymeric material bands, whereby concentrated stresses adjacent the collars are minimized.

2. The improvement in a drive wire according to claim 1 wherein one of the metal collars is an integral part of the coupling sleeve.

3. The improvement in a drive wire according to claim 1 or claim 2 wherein the covering of the transfer wire is a polyamide having a lubricant incorporated therein.

4. The improvement in a drive wire according to claim 3 wherein the lubricant is a member of the group consisting of silicon and graphite.

* * * * *